Inventor
WILLIAM K. ERGEN
By
C D Tuska
Attorney

Inventor
WILLIAM K. ERGEN
C. D. Tuska
Attorney

May 13, 1952
W. K. ERGEN
2,596,472
WIND DATA COMPUTER
Filed June 14, 1947
3 Sheets-Sheet 3

Inventor
WILLIAM K. ERGEN
By
C D Tuska
Attorney

Patented May 13, 1952 2,596,472

UNITED STATES PATENT OFFICE 2,596,472

WIND DATA COMPUTER

William K. Ergen, Moorestown, N. J., assignor to Radio Corporation of America, a corporation of Delaware Application June 14, 1947, Serial No. 754,738

11 Claims. (Cl. 235—61)

Figure 1:
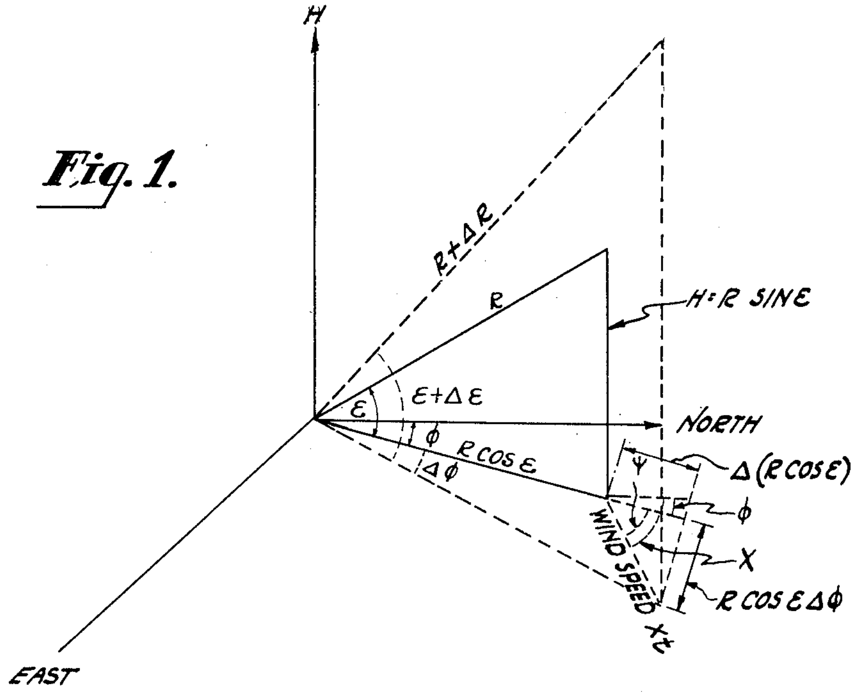

This invention relates to computing devices such as are adapted to provide data on the speed and direction of the wind in response to the positions of certain shafts which are representative of the slant range, elevation and azimuth of a meteorological balloon or like object which moves freely with the wind. More specifically the atmosphere is divided into a number of horizontal layers or "zones" and the average of wind speed and wind direction is computed for each zone.

A wind data computer of the prior art is based on a solution which is, except for the effect of the curvature of the earth, mathematically exact. This prior art computer is, however, very sensitive to imperfections in the component parts. This is due to the fact that the wind data appear as small differences between large quantities and errors, forming a small percentage of these large quantities, are a seriously large percentage of the wind data.

The computer of the present invention is based on a solution which is mathematically only an approximation, but operates directly with the differential quantities. Errors and imperfections in the equipment will then show up as output errors of the same order of magnitude, and not of a greater order of magnitude.

The equations on which the present design is based are exact representations of the actual relationship if the rising speed of the balloon and the wind are constant for all altitudes, or if at least the ratio between rising speed and wind speed as well as the wind direction remains constant with altitude. Deviations of the approximate formulae from the actual relationships are likely to be greatest when the ratio between rising and wind speed varies considerably, or when the wind direction is very much different at different altitudes. One such case has been quantitatively investigated and the error was found to be only 3.2 per cent. This was a rather extreme case, and in almost all practical cases the mathematical error would be far less.

The principal object of the invention is to provide an improved computing device and method of operation whereby the necessity of extreme accuracy in its component parts is avoided. Other objects of the invention are the provision of a computing device which is less complicated than similar devices of the prior art; and the provision of a computing device which operates with quantities such that the computed data is not unduly affected by imperfections in the equipment.

The invention will be better understood from the following description considered in connection with the accompanying drawings and its scope is indicated by the appended claims.

Figure 4:
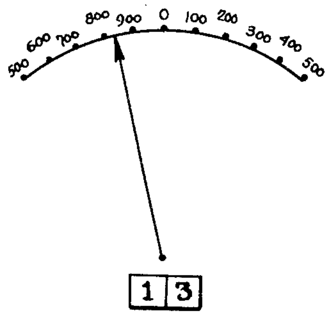
Figure 2:
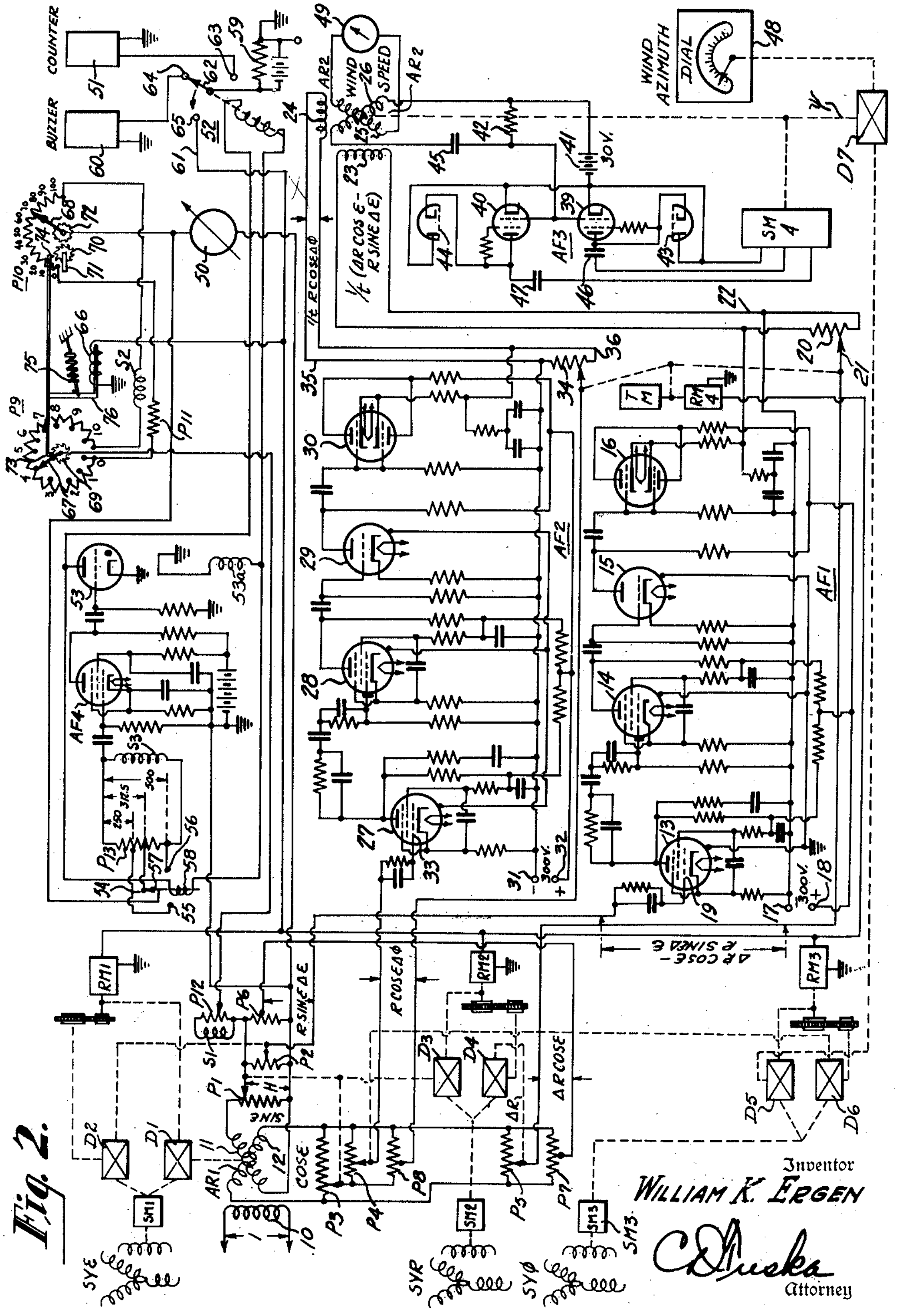
Figure 3:
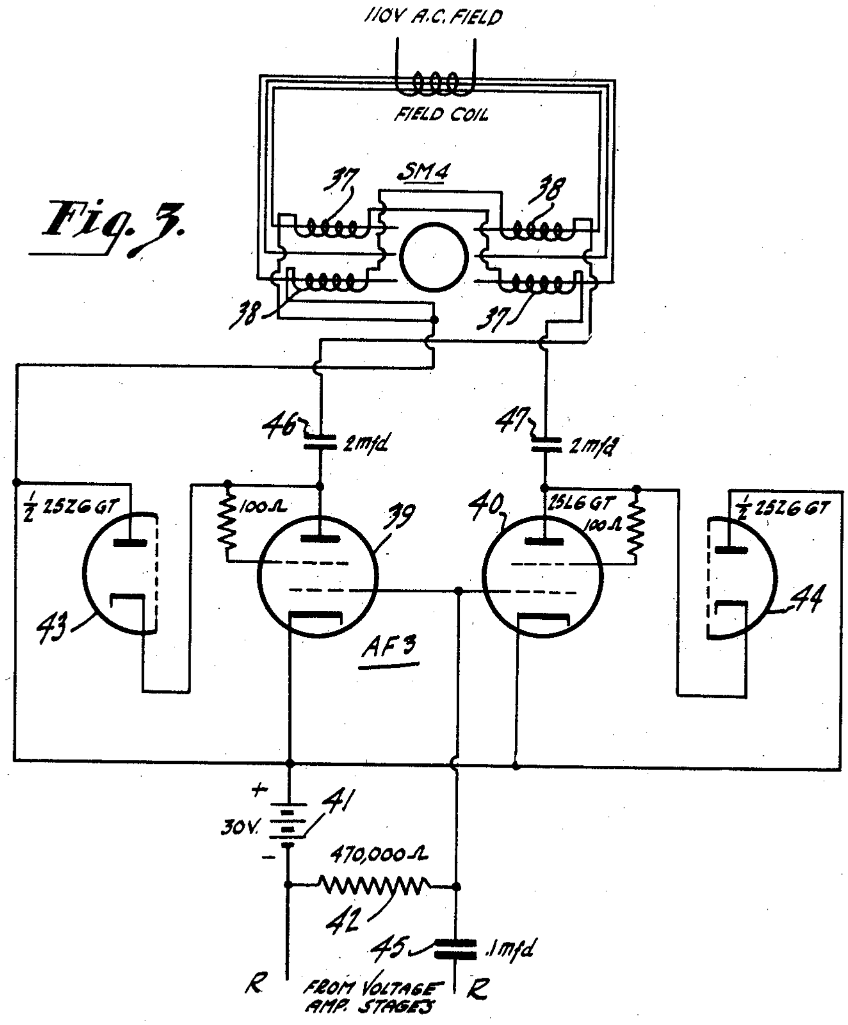
Figure 5:
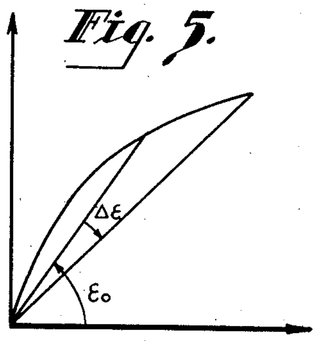
Figure 6:
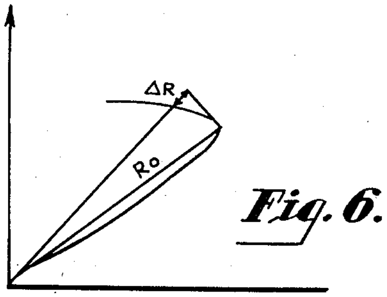

Referring to the drawings:

Fig. 1 is an explanatory diagram indicating the various relations involved in the computation, Fig. 2 is a wiring diagram of a preferred form of the computing device, Fig. 3 is a wiring diagram showing the connections of a servomotor to an amplifier by which it is controlled, Fig. 4 is an explanatory diagram relating to the operation of an altitude meter, Figs. 5 and 6 are explanatory diagrams relating to various conditions under which the computer may be required to operate.

The geometry of the problem is illustrated in Fig. 1 wherein

R is the slant range
$\epsilon$ is the elevation angle
$\phi$ the azimuth of the balloon
X the wind azimuth
$\psi = X - \phi$ the angle between wind direction and line of sight to the balloon.

The ground range is $R \cos \epsilon$.

The product of wind speed and time $t$ appears as the hypothenuse of a right triangle, the two legs of which are approximately $$R \cos \epsilon \, \Delta \phi \qquad (1)$$

and $$\Delta (R \cos \epsilon) = \Delta R \cos \phi - R \sin \epsilon \, \Delta \epsilon \qquad (2)$$

The relationship (1) and the left side of Equation 2 can be seen from the drawing, if one considers that the increments are small, so that their products, squares and higher powers can be neglected. For instance $$[R \cos \epsilon + \Delta (R \cos \epsilon)] \sin \Delta\phi$$

is replaced by $R \cos \epsilon \, \Delta \phi$, by replacing $\sin \Delta \phi$ by $\Delta \phi$ and neglecting the product $\Delta (R \cos \epsilon) \, \Delta \phi$. The right side of Equation 2 follows from the left side by the rules of differential calculus, again considering the increments as small.

The angle $\psi$ also appears in this triangle. The wind azimuth is obtained by $$X = \psi + \phi \qquad (3)$$

The altitude is given by $$H = R \sin \epsilon \qquad (4)$$

In the above Equations 1, 2, and 3, greatest accuracy is obtained if R, $\epsilon$, and $\phi$ are given the values which they have in the middle of the zone in question. If R, $\epsilon$, and $\phi$ are given the values of the beginning or end of the zone, less accuracy is obtained.

The circuit of Fig. 2 includes an elevation angle synchro $SY\epsilon$, a slant range synchro SYR and a balloon azimuth synchro $SY\phi$. A servomotor SM1 is interposed between the synchro $SY\epsilon$ and a pair of differentials D1 and D2. A servomotor SM2 is interposed between the synchro SYR and a pair of differentials D3 and D4. A servomotor SM3 is interposed between the synchro $SY\phi$ and a pair of differentials D5 and D6.

An angle resolver AR1 includes a winding 10 with which are inductively associated the rotor windings 11 and 12. "Unit" voltage is applied to the winding 10 and the rotor windings 11 and 12 are positioned primarily by the servomotor SM1 which also rebalances the elevation angle synchro $SY\epsilon$. Every time the angle $\epsilon$ changes, the follower synchro gets out of balance with respect its leader synchro (not shown) and the servomotor SM1 is made to rebalance.

The servomotor SM1 drives the angle resolver AR1 through the differential D1. While the balloon is within a zone, the right leg of the differential is locked by the practically irreversible gear train of a reset motor RM1. Since the angle resolver is connected to the center leg of the differential, it is driven at half the speed of the output shaft of SM1.

The servomotor SM1 also drives the differential D2. While the balloon is within a zone, the center leg of this differential is locked by the irreversible gear train on RM1, and the right leg moves at a speed equal to the speed of the servomotor. This leg positions the slider on a potentiometer P2.

When the balloon reaches the end of the zone, the reset motor goes into action. It drives the slider on P2 through the differential D2, until the slider reaches the zero position of P2. It also drives the AR1 rotor through differential D1.

Considering now the operation for the time interval during which the balloon passes through one particular zone, let $\epsilon_0$ be the elevation angle at the moment at which the balloon enters the zone. Let $\Delta\epsilon$ be the difference $\epsilon-\epsilon_0$; in other words $\Delta\epsilon$ is the change which $\epsilon$ has undergone since the balloon entered the zone. The rotor AR1 is positioned according to $\epsilon_0$, when the balloon enters the zone.

While the balloon ascends, the servomotor SM1 moves to accommodate the changes in $\epsilon$. Half of this change will be transmitted to the rotor AR1. This rotor is thus positioned according to $$\epsilon_0+\frac{\Delta\epsilon}{2}$$

The changes are transmitted in full to the slider on P2. This slider is thus moved according to $\Delta\epsilon$.

When the balloon reaches the end of the zone, the reset motor is put into operation. It drives the slider on P2, one revolution of the motor output shaft corresponding to one revolution on the slider. The 1:2 gearing up in the differential is compensated by a 2:1 gear train. When the slider reaches the zero position, the motor output shaft has rotated by $\Delta\epsilon$. Half of this motion is again transmitted through differential D1 to the rotor of AR1, the sense of rotation being such that this motion is added to the previous one.

At the end of the operation, the rotor of AR1 is in the position $\epsilon_0+\Delta\epsilon$, which is the new starting value for $\epsilon$, when the balloon enters the next zone. Thus, at any passage from one zone to the other, the rotor of AR1 will be positioned according to $\epsilon_0$, and while the balloon goes through a zone, the rotor is positioned according to $$\epsilon_0+\tfrac{1}{2}\Delta\epsilon$$

A similar arrangement is connected to the servomotor SM2 which rebalances the slant range synchro SYR. This motor turns the sliders on potentiometers P1 and P3, through a differential D3 as indicated in connection with the servomotor SM1. While the balloon climbs on through a zone, half of the change in R is fed into these sliders. SM2 also feeds the full value of changes in R into the slider on P5. This is done through differential D4. The reset motor RM2 locks the right leg of differential D3 and the center leg of differential D4 while the balloon is within a zone. At the end of the zone, it sets the $\Delta R$ slider on P5 to the zero position and moves the sliders on P1 and P3 by another step $\Delta R/2$.

The 2:1 gear train between RM2 and D4 has a function analogous to the function of the corresponding gear train between RM1 and D2.

The servomotor SM3 rebalances the $\phi$ synchro $SY\phi$ as indicated in connection with the servomotor SM1. This servomotor cooperates with a rebalancing motor RM3 and the differentials D5 and D6 in system quite analogous to the corresponding systems already described. In this way, the slider on P4 is positioned according to $\Delta\phi$ and the center leg of D5 according to $\phi_0+\Delta\phi 2$, while the balloon is within a zone. At the zone boundary the slider on P4 is reset to the zero position and the center leg of D5 is positioned according to the $\phi$ value at the boundary.

It has to be considered that $\Delta\epsilon$, $\Delta R$, and $\Delta\phi$ may be positive as well as negative. In general, $\Delta\epsilon$ and $\Delta R$ will be positive. However, for instance, in the case shown in Fig. 5, one obtains a negative $\Delta\epsilon$. In this case, the wind direction remains constant and the wind speed increases faster than the rate of climb (exactly speaking, the ratio between wind speed and rate of climb increases).

Fig. 6 shows an example of negative $\Delta R$. Here, the balloon gets, at a certain altitude, into a strong wind the direction of which is opposite to the wind direction on the ground.

In order to accommodate these negative and positive values, the $\Delta\epsilon$, $\Delta R$, and $\Delta\phi$ pots (P2, P5, and P4 respectively) have been connected in parallel with fixed voltage dividers P6, P7, and P8, respectievly. The voltage difference between the center point of P6 and the slider on P2 is proportional to $\Delta\epsilon$, the voltage difference between the center point of P7, and the slider on P5 is proportional to $\Delta R$ and the voltage difference between the center point on P8 and the slider on P4 is proportional to $\Delta\phi$. Incidentally, the "center points" of P6, P7, and P8 do not have to be the exact centers, especially if it could be shown that the greatest possible negative values of $\Delta\epsilon$ and $\Delta R$ are smaller than the corresponding greatest positive values. The zero position of the sliders on P2, P4, and P5 is the position which gives zero voltage between the slider and the center point of the fixed pot.

The angle resolver AR1 yields voltages sin $\epsilon$ and cos $\epsilon$ sin $\epsilon$ is multiplied on pot. P1 by R. The resulting product $R \sin \epsilon = H$ is multiplied on P2 by $\Delta\epsilon$. The result is $R \sin \epsilon\Delta\epsilon$. Cos $\epsilon$ is multiplied on P5 by ΔR. The result, $\Delta R \cos \epsilon$, is added algebraically to $R \sin \epsilon\Delta\epsilon$, and the difference, $$\Delta R \cos \epsilon - R \sin \epsilon\Delta\epsilon$$

is fed into the dividing amplifier AF1.

The dividing amplifier AF1 includes stages 13, 14, 15 and 16. Operating potential is applied to the different stages from terminals 17 and 18. A control potential representative of the value of $\Delta R \cos \epsilon - R \sin \epsilon\Delta\epsilon$ is applied to the control grid 19 of the first stage 13, this input potential being derived from the potentiometers P2 and P5 as previously indicated. The output potential of the last stage 16 is applied to a potentiometer 20 which has its contact 21 controlled by a timing motor TM. With these connections, there is made available at the output leads 21 and 22 a potential representative of the value of $$\frac{\Delta R \cos \epsilon - R \sin \epsilon\Delta\epsilon}{t}$$

The leads 21 and 22 are connected to the stator winding 23 of an angle resolver AR2. This angle resolver also includes a stator winding 24 and rotor windings 25 and 26 which are mechanically coupled to the servomotor SM3 through the differential D5 and a differential D7.

The dividing amplifier AF2 includes stages 27, 28, 29 and 30. Operating potential is applied to these stages from leads 31 and 32. A control potential representative of the value of $R \cos \epsilon\Delta\phi$ is applied to the control grid 33 of the first stage 27, this input potential being derived from the potentiometers P4 and P8 as previously indicated. The output potential of the last stage 30 is applied to a potentiometer 34 which has its contact controlled by the timing motor TM so that there is made available at the leads 35 and 36 a potential representative of the value of $$\frac{R \cos \epsilon\Delta\phi}{t}$$

This potential is applied to the winding 24 of the angle resolver AR2.

The angle resolver AR2 has its rotor winding 26 connected through an amplifier AF3 to a servomotor SM4 which controls the position of the center leg of the differentials D7.

The connections between the winding 26 and the servomotor SM4 are shown by the wiring diagram of Fig. 3. The servomotor SM4 is illustrated as of shaded pole type having high impedance shading windings 37 and 38 for each direction of rotation. Each winding develops 140 volts and these voltages are applied in opposite phase to the plates of tubes 39 and 40. These tubes serve as absorbers, passing current through one or the other of the shading windings to cause the motor to run in the proper direction.

The tubes 39 and 40 are biased nearly to cutoff by a battery 41 so that neither tube conducts till the voltage across a resistor 42 is changed. Change in this voltage is applied in the same phase to the grids of both tubes. Consequently, the tube having its anode voltage in phase with the grid voltage will conduct during the positive half cycle and the negative half cycle will be passed by the diode 43 or 44 which is connected in shunt to it. Thus, the full wave current flows through the proper shading winding to cause the motor to turn in a direction corresponding to the phase of the voltage derived from the winding 26. The winding 26 is coupled to the grids of the tubes 39 and 40 through a capacitor 45 and capacitors 46 and 47 are provided for preventing each diode from conducting when its associated tube 39 or 40 is conducting.

Under the control of the amplifier AF3, the servomotor SM4 positions the rotor windings 25 and 26 of the angle resolver AR2 until the voltage on the coil 26 is zero. Then the windings 25 and 26 are positioned according to $\psi$ (the angle between the wind direction and line of sight of the balloon) and $\psi$ and $\phi$ are combined in the differential D7 according to Equation 3 to give the wind azimuth which is indicated by a meter 48.

Under these conditions, there is produced in the winding 25 a potential which is representative of the value of the wind speed $$\frac{1}{t}\sqrt{(\Delta R \cos \epsilon - R \sin \epsilon\Delta\epsilon)^2 + R^2 \cos^2 \epsilon(\Delta\phi)^2}$$

and is indicated by a meter 49.

The foregoing relations may be better understood from the more detailed explanation which follows. If two perpendicular stator coils of an angle resolver are supplied with voltages X and Y, respectively, they set up a resultant field proportional to $\sqrt{X^2+Y^2}$. The direction of this field forms an angle with one of the stator coils which is equal to the angle between the hypotenuse and one leg of a right triangle with legs X and Y. In a rotor coil oriented in a perpendicular direction to this resultant field, no voltage will be induced, but if the rotor coil is displaced to one side or the other from this perpendicular direction, a voltage of one phase or other will be induced in the rotor coil. A phase sensitive amplifier-and-servomotor system can thus be used to bring the rotor coil in this perpendicular position, and this position is indicative of the angle between hypotenuse and one leg of the above right triangle.

Another rotor coil, oriented at 90° to the above named rotor coil will then be parallel to the resultant field and in this coil a voltage will be induced which is proportional to the field, that is to $\sqrt{X^2+Y^2}$. This is a standard use of angle resolvers well known to the art. The squaring comes from the theorem of Pythagoras.

Except for a proportionality factor involving the time differential $\Delta t$, the rates ($\dot{R}$, $\dot{\phi}$, $\dot{\epsilon}$ and windspeed) are identical with $\Delta R$, $\Delta\phi$, $\Delta\epsilon$, and windspeed $x\Delta t$. Hence, it is evident that the voltages fed into the stator coils 23 and 24 correspond to the legs of the right triangle mentioned just prior to the Expression 1, supra, and depicted in Fig. 1. According to the above, the amplifier-and-servosystem will orient the rotor coils according to the angle between the hypotenuse and one leg, that is according, to $\psi$, and a voltage proportional to the windspeed will be induced in the other rotor coil.

The timing motor TM, which operates while the balloon is within a zone to position the contacts of the timing potentiometers 20 and 34, may be adapted also to perform the function of the reset motor RM4 by which the timing potentiometers are returned to their zero positions. In this case, the timing motor would run, during the reset procedure, in the reversed direction at increased speed. This result is produced by the use of a governor controlled D.-C. or A.-C. motor, the speed increase being effected by switching off the governor.

The computer also includes an altitude indicator 50 which reads up to 1,000 feet and a counter 51 which indicates altitude in terms of 1,000 feet. The indicator 50 is energized from P1, P9, P10, P11 and P12. The counter 51 has its input controlled by a three-point switch 52 which is operated in a counterclockwise direction from one fixed contact to another each time current is conducted by a thyratron 53. The plate of this thyratron is supplied with alternating potential from the source 53*a*. It is well known that the grid of such a tube does not lose control under these conditions. The conductivity of the thyratron 53 is controlled by an amplifier AF4. Input potential is applied to the amplifier AF4 from a potentiometer P13 which has three terminals 54, 55 and 56 arranged to cooperate with a movable contact member 57. The contact member 57 is rotated in a clockwise direction from one to another of the contacts 55, 54, and 56 each time its operating coil 58 is energized by current flowing through the thyratron 53.

The secondary windings S1, S2 and S3 are inductively associated with the winding 10 of the angle resolver AR1. Under these conditions, voltages are produced across P9 to P13.

A source of voltage, indicated as a resistor 59 is provided for successively energizing the counter 51, a buzzer 60 and a reset circuit 61 as the movable contact 62 of the switch 52 is notched into successive engagement with the fixed contacts 63, 64 and 65. When the contacts 62 and 65 are engaged, two results are produced. First, the reset motors RM1 to RM4 are operated to reset the potentiometers which they control. Second, a relay coil 66 is energized to move the contact 67 of the potentiometer P9 from one fixed contact to the next. Each time the potentiometer contact 67 has made one complete revolution, the movable contact 68 of the potentiometer P10 is moved from one fixed contact to the next. This result is produced by means of ratchets 69 and 70 which move with the contact 67 and a one tooth gear 71 which cooperates with a ten tooth gear 72 fixed to the shaft of the contact 68. Return of the pawls 73 and 74 to their standby positions is effected by a compression spring 75 which presses against the core 76 of the relay.

While the balloon is within a zone, the output voltage on the slider on P1 is $$\left(R_0+\frac{\Delta R}{2}\right)\sin\left(\epsilon_0+\frac{\Delta\epsilon}{2}\right)$$

This is very closely equal to $$H_0+\tfrac{1}{2}\Delta H$$

First the voltage is corrected for the elevation of the meteorological station. This is done by adding a voltage proportional to this elevation to the voltage obtained from slider 67. The first named voltage is taken off the pot. P12. The winding S1, as well as the windings S2 and S3, are secondaries of the transformer which also feeds the unit voltage into AR1 as already indicated.

The corrected voltage $H_0+\frac{1}{2}\Delta H$ is now compared with a voltage proportion to $H_0$. The latter voltage is obtained from P9, P10 and P11. P9 is adjustable in steps corresponding to 1,000 feet; the steps on P10 are 10,000 feet. P11 is set at a fixed value corresponding to 500 feet.

The difference ($\frac{1}{2}\Delta H$) between the voltages $H_0+\frac{1}{2}H$ and $H_0$ is fed into a meter 50 of high impedance. The meter is calibrated as shown in Fig. 4. The zero voltage position most to the left is marked 500; from there on the numbers on the markings increase until they reach 1,000 at the center of the scale. This center is, however, marked 0, and then the numbers increase until they reach 500 at the right end of the scale. The scale factor is such that a change of the voltage $\frac{1}{2}\Delta H$ by 50 feet corresponds to a change in meter reading of 100 feet. In this way the meter reading changes are equal to the altitude changes.

The voltage $\frac{1}{2}\Delta H$ is also compared with the voltage of the potentiometer P13. This latter voltage may be adjusted to correspond to 250, 312.5 or 500 feet, the adjustment being made by the switch 54, 55, 56 and 57. As soon as the voltage $\frac{1}{2}\Delta H$ exceeds the voltage on P13, it trips the thyratron 53 through the amplifier AF4.

If observation of the balloon starts at an altitude of 500 feet (the altitude being corrected for station elevation): Pots. P9 and P10 are both set to zero. The corrected altitude of 500 feet is just counterbalanced by the 500-foot voltage on P11 and no voltage is applied to the meter. Thus, the meter scale shows 500 feet.

After the balloon has risen to 600 feet, a voltage of 550 feet is applied as the $H_0+\frac{1}{2}\Delta H$ voltage. This makes the voltage on the meter 50 feet, and the pointer thus points to 600 feet.

When the balloon approaches 1,000 feet, the meter will show values which also approach 1,000. As soon as 1,000 feet is reached, the $\frac{1}{2}\Delta H$ voltage is 250 feet, and the thyratron is tripped for the first time. This moves switch arm 62 from its zero position at contact 65 to contact 63 and thus a current is sent through counter 51, which moves the counter by one unit. The counter indicates the altitude in thousands of feet. The meter 50 now reads zero and the total reading of counter and meter is 1,000 feet.

The tripping of the thyratron also turns the switches 57 and 62 by one notch. Thus, the $\frac{1}{2}\Delta H$ voltage is again smaller than the voltage on P13, which extinguishes the thyratron. However, when the $\frac{1}{2}\Delta H$ voltage reaches 312.5 feet (that is, when the balloon is 375 feet from the upper limit of the zone), the $\frac{1}{2}\Delta H$ voltage reaches again the P13 voltage. This trips the thyratron 53 a second time, which starts the warning buzzer 60, and moves switches 57 and 62 by another notch.

The P13 voltage is now 500 feet and thus greater than the $\frac{1}{2}\Delta H$ voltage and the thyratron is extinguished.

When $\frac{1}{2}\Delta H$ now reaches 500 feet, the balloon is at the upper limit of the zone. The thyratron 53 is again made conductive and this time it (1) Resets 57 and 62 to their zero positions.
(2) Starts the reset motors RM1 to RM4,
(3) Moves the switch 67 on the stepwise adjustable potentiometer P9 by one step,
(4) Switches off the buzzer or signal light.

The reset motors RM1 to RM4 run until they accomplish the zeroing of their potentiometer. While this is done, the voltage on P1 increases by another 500 feet and it now is 1,000 feet greater than at the start of the zone. However, the switching of P9 substracts 1,000 more feet. Thus, the $\frac{1}{2}\Delta H$ voltage is back to zero. The thyratron is off and the next zone starts just as the previous one.

When this process has been repeated 10 times, the pot. P10 moves one step up and P9 is set back to zero. P9 and P10 may be mechanically connected to a counter to indicate the zone.

What the invention provides is an improved wind data computer which is of relatively simple construction, permits less accuracy in the construction of its component parts than that heretofore required in devices of this character and functions to provide data having the required degree of accuracy.

I claim as my invention:

1. In a device for continuously deriving a potential representative of the altitude of a moving object from shaft positions representative of the slant range and elevation angle of said object, the combination of means responsive to said slant range and elevation angle representative shaft positions for producing a first potential of one polarity which is representative of the product of said range and the sine of said angle, means for producing a second potential of opposite polarity which is adjustable to represent successive predetermined values of said product for producing a third potential which is adjustable to successive predetermined values of the resultant of said first and second potentials, means responsive to said resultant exceeding a first one of said third potential values to adjust said third potential producing means to produce another of its successive values which exceeds said resultant, means responsive to one predetermined number of operations of said adjusting means to adjust said second potential producing means to produce another of its successive values and means responsive to another predetermined number of operations of said adjusting means to produce a counting pulse which is a measure of the altitude.

2. In a device for continuously deriving a potential representative of the altitude of a moving object from shaft positions representative of the slant range and elevation angle of said object, the combination of means responsive to said slant range and elevation angle representative shaft positions for producing a first potential of one polarity which is representative of the product of said range and the sine of said angle, means for producing a second potential of opposite polarity which is adjustable to represent successive predetermined values of said product, means for producing a third potential which is adjustable to successive predetermined values of the resultant of said first and second potentials, means responsive to said resultant exceeding one of said third potential values to adjust said third potential producing means to produce another of its successive values which exceeds said resultant, means responsive to one predetermined number of operations of said adjusting means to adjust said second potential producing means to produce another of its successive values and means responsive to another predetermined number of operations of said adjusting means to produce a warning signal.

3. In a device for continuously deriving a potential representative of the altitude of a moving object from shaft positions representative of the slant range and elevation angle of said object, the combination of means responsive to said slant range and elevation angle representative shaft positions for producing a first potential of one polarity which is representative of the product of said range and the sine of said angle, means for producing a second potential of opposite polarity which is adjustable to represent successive predetermined values of said product, means for producing a third potential which is adjustable to successive predetermined values of the resultant of said first and second potentials, means responsive to said resultant exceeding one of said third potential values to adjust said third potential producing means to produce another of its successive values, means responsive to a predetermined number of operations of said adjusting means to adjust said second potential producing means to produce another of its successive values and to restore said potential producing means to the first of its successive values.

4. In a device for continuously deriving a potential representative of the altitude of a moving object from shaft positions representative of the slant range and elevation angle of said object, the combination of means responsive to said slant range and elevation angle representative shaft positions for producing a first potential of one polarity which is representative of the product of said range and the sine of said angle, means for producing a second potential of opposite polarity which is adjustable to represent successive predetermined values of said product, means for producing a third potential which is adjustable to successive predetermined values of the resultant of said first and second potentials, means responsive to said resultant exceeding one of said third potential values to adjust said third potential producing means to produce another of its successive values which exceeds said resultant, means responsive to one predetermined number of operations of said adjusting means to produce a counting pulse, means responsive to another predetermined number of operations to adjust said second potential producing means to another of its successive values and to restore said third potential producing means to the first of its successive values, and means to display the number of counting pulses and the amplitude of said resultant as a measure of the altitude of said moving object.

5. In a device for continuously deriving a potential representative of the speed of wind from shaft positions representative of the elevation angle, the slant range and the azimuth angle of an object free to move in said wind; the combination of an angle resolver having a pair of stator windings and a pair of rotor windings; means for deriving a potential representative of the product of said slant range times the cosine of said elevation angle times an increment of said azimuth angle; means for applying to one of said stator windings a potential representative of said product divided by the time during which said increment occurs; means for deriving a potential representative of the difference between the product of an increment of said slant range times the cosine of said elevation angle and the product of said slant range times the sine of said elevation angle times an increment of said elevation angle, means for applying the other of said stator windings a potential representative of said difference divided by said time; and means responsive to the potential of one of said rotor windings for positioning said rotor windings in accordance with the angle between the direction of said wind and the line of sight to said object.

6. In a device for continuously deriving a potential representative of the speed of wind from shaft positions representative of the elevation angle, the slant range and the azimuth angle of an object free to move in said wind; the combination of an angle resolver having a pair of stator windings and a pair of rotor windings; means for deriving a potential representative of the product of said slant range times the cosine of said elevation angle times an increment of said azimuth angle; means for applying to one of said stator windings a potential representative of said product divided by the time during which said increment occurs; means for deriving a potential representative of the difference between the product of an increment of said slant range times the cosine of said elevation angle and the product of said slant range times the sine of said elevation angle times an increment of said elevation angle; means for applying to the other of said stator windings a potential representative of said difference divided by said time; means responsive to the potential of one of said rotor windings for positioning said rotor windings in accordance with the angle between the direction of said wind and the line of sight to said object; and means connected to the other of said rotor windings for indicating the speed of said wind.

7. In a device for continuously deriving a potential representative of the speed of wind from shaft positions representative of the elevation angle, the slant range and the azimuth angle of an object free to move in said wind; the combination of an angle resolver having a pair of stator windings and a pair of rotor windings; means for deriving a potential representative of the product of said slant range times the cosine of said elevation angle times an increment of said azimuth angle; means for applying to one of said stator windings a potential representative of said product divided by the time during which said increment occurs; means for deriving a potential representative of the difference between the product of an increment of said slant range times the cosine of said elevation angle and the product of said slant range times the sine of said elevation angle times an increment of said elevation angle; means for applying to the other of said stator windings a potential representative of said difference divided by said time; means responsive to the potential of one of said rotor windings for positioning said rotor windings in accordance with the angle between the direction of said wind and the line of sight to said object; and means responsive to said positioning and controlled in accordance with said azimuth angle for indicating the direction of said wind.

8. In a device for continuously deriving a potential representative of the speed of wind from shaft positions representative of the elevation angle, the slant range and the azimuth angle of an object free to move in said wind; the combination of an angle resolver having a pair of stator windings and a pair of rotor windings; means for deriving a potential representative of the product of said slant range times the cosine of said elevation angle times an increment of said azimuth angle; means for applying to one of said stator windings a potential representative of said product divided by the time during which said increment occurs; means for deriving a potential representative of the difference between the product of an increment of said slant range times the cosine of said elevation angle and the product of said slant range times the sine of said elevation angle times an increment of said elevation angle; means for applying the other of said stator windings a potential representative of said difference divided by said time; means responsive to the potential of one of said rotor windings for positioning said rotor windings in accordance with the angle between the direction of said wind and the line of sight to said object; and means including a differential responsive to said positioning and controlled in accordance with said azimuth angle for indicating the direction of said wind.

9. In a device for continuously deriving a first potential representative of the speed of wind and an indication representative of the direction of wind in response to shaft positions representative of the slant range, elevation angle and azimuth angle of an object free to move in said wind; the combination of a plurality of potentiometer means each operable to a reset condition; means for deriving from different ones of said potentiometer means four potentials as follows; a second potential which is representative of the altitude of said object, a third potential which is representative of the product of said slant range times the sine of said elevation angle times an increment of said elevation angle, a fourth potential which is representative of the product of said slant range times the cosine of said elevation angle times an increment of said azimuth angle and a fifth potential which is representative of the product of an increment of said slant range times the cosine of said elevation angle; means for subtracting said third potential from said fifth potential to provide a difference potential, means for dividing said difference potential by the time duration of said angle increment, means for dividing said fourth potential by the time of the occurrence of said angle increment, and means to vectorially combine said time divided difference potential and said time divided fourth potential to generate said first potential equivalent to the square root of the sum of the squares of said potentials being combined vectorially, means responsive to said vectorial combining means and controlled in accordance with said azimuth angle for producing said indication; and means responsive to predetermined values of the second of said potentials for operating said potentiometer means to their reset conditions.

10. In a device for continuously deriving a potential representative of the speed of wind from shaft positions representative of the elevation angle, the slant range and the azimuth angle of an object free to move in said wind; the combination of a first angle resolver including a rotor having a pair of rotor windings and a stator having a stator winding, means to impress a unitary voltage upon said stator winding, means to position said rotor proportionally to said elevation angle shaft position to induce a voltage in one of said pair of rotor windings proportional to the sine of said elevation angle and to induce a voltage in the other of said pair of rotor windings proportional to the cosine of said elevation angle, a first potentiometer connected across said one rotor winding, means to move said first potentiometer slider proportionally to said slant range shaft position to provide a first potentiometer output voltage proportional to the product of said slant range and the sine of said elevation angle, a second potentiometer connected across said first potentiometer output, means to move said second potentiometer slider proportionally to increments in said elevation angle shaft positions to provide a second potentiometer output voltage proportional to the product of said slant range, said sine of said elevation angle and said elevation angle increment, a third potentiometer connected across said other of said pair of rotor windings, means to move said third potentiometer slider proportionally to said slant range shaft position to provide a third potentiometer output voltage proportional to the product of said slant range and the cosine of said elevation angle, a fourth potentiometer connected across said third potentiometer output, means to move said fourth potentiometer slider proportionally to increments in said azimuth angle shaft positions to provide a fourth potentiometer output voltage proportional to the product of said slant range, said cosine of said elevation angle and said increments in said azimuth angle, a fifth potentiometer connected across said other rotor winding, means to move said fifth potentiometer wiper arm proportionally to increments in said slant range shaft positions to provide a fifth potentiometer output voltage proportional to the product of said slant range increment and the cosine of said elevation angle, means to subtract said fifth potentiometer output voltage from said second potentiometer output voltage to provide a difference voltage, means to divide said fourth potentiometer output voltage by the time during which said increments occur, means to divide said difference voltage by the time during which said increments occur, a second angle resolver including a stator having a pair of stator windings and a rotor having a pair of rotor windings, means for applying to one of said stator windings said difference voltage divided by said time, means for applying to the other of said stator windings said fourth potentiometer output voltage divided by said time, and means responsive to the potential induced in one of said rotor windings to rotate said second angle resolver rotor to an angle to substantially eliminate said last named potential whereby said second angle resolver rotor is positioned in accordance with the angle between the direction of said wind and the line of sight to said object, the potential induced in the other of said rotor windings being proportional to the wind speed.

11. In a device for continuously deriving a potential representative of the speed of wind from shaft positions representative of the elevation angle, the slant range and the azimuth angle of an object free to move in said wind; the combination of a first angle resolver including a rotor having a pair of rotor windings and a stator having a stator winding, means to impress a unitary voltage upon said stator winding, means to position said rotor proportionally to said elevation angle shaft position to induce a voltage in one of said pair of rotor windings proportional to the sine of said elevation angle and to induce a voltage in the other of said pair of rotor windings proportional to the cosine of said elevation angle, a first potentiometer connected across said one rotor winding, means to move said first potentiometer slider proportionally to said slant range shaft position to provide a first potentiometer output voltage proportional to the product of said slant range and the sine of said elevation angle, a second potentiometer connected across said first potentiometer output, means to move said second potentiometer slider proportionally to increments in said elevation angle shaft positions to provide a second potentiometer output voltage proportional to the product of said slant range, said sine of said elevation angle and said elevation angle increment, a third potentiometer connected across said other of said pair of rotor windings, means to move said third potentiometer slider proportionally to said slant range shaft position to provide a third potentiometer output voltage proportional to the product of said slant range and the cosine of said elevation angle, a fourth potentiometer connected across said third potentiometer output, means to move said fourth potentiometer slider proportionally to increments in said azimuth angle shaft positions to provide a fourth potentiometer output voltage proportional to the product of said slant range, said cosine of said elevation angle and said increments in said azimuth angle, a fifth potentiometer connected across said other rotor winding, means to move said fifth potentiometer wiper arm proportionally to increments in said slant range shaft positions to provide a fifth potentiometer output voltage proportional to the product of said slant range increment and the cosine of said elevation angle, means to subtract said fifth potentiometer output voltage from said second potentiometer output voltage to provide a difference voltage, means to divide said fourth potentiometer output voltage by the time during which said increments occur, means to divide said difference voltage by the time during which said increments occur, a second angle resolver including a stator having a pair of stator windings and a rotor having a pair of rotor windings, means for applying to one of said stator windings said difference voltage divided by said time, means for applying to the other of said stator windings said fourth potentiometer output voltage divided by said time, means responsive to the potential induced in one of said rotor windings to rotate said second angle resolver rotor to an angle to substantially eliminate said last named potential whereby said second angle resolver rotor is positioned in accordance with the angle between the direction of said wind and the line of sight to said object, the potential induced in the other of said rotor windings being proportional to the wind speed, and means responsive to said second angle resolver rotor position and said azimuth shaft position to provide a sum indicative of the direction of the wind.

WILLIAM K. ERGEN.

REFERENCES CITED

The following references are of record in the file of this patent:

UNITED STATES PATENTS

| Number | Name | Date |
|---|---|---|
| 2,382,994 | Holden | Aug. 21, 1945 |
| 2,404,387 | Lovell et al. | July 23, 1946 |
| 2,408,081 | Lovell | Sept. 24, 1946 |
| 2,439,381 | Darlington | Apr. 13, 1948 |
| 2,442,597 | Greenough | June 1, 1948 |
| 2,443,624 | Lovell et al. | June 22, 1948 |
| 2,444,770 | Flyer | July 6, 1948 |
| 2,444,771 | Flyer | July 6, 1948 |
| 2,465,624 | Agins | Mar. 29, 1949 |
| 2,467,179 | Andresen, Jr. | Apr. 12, 1949 |
| 2,467,646 | Agins | Apr. 19, 1949 |

FOREIGN PATENTS

| Number | Country | Date |
|---|---|---|
| 579,325 | Great Britain | July 31, 1946 |

OTHER REFERENCES

Shannon: "Electronic Computers," Electronics, August 1946, p. 110.